United States Patent
Lai et al.

(10) Patent No.: US 9,279,932 B2
(45) Date of Patent: *Mar. 8, 2016

(54) LGF ROLL-TO-ROLL MANUFACTURING METHOD AND STRUCTURE THEREOF

(75) Inventors: Hsin-Yi Lai, Taichung (TW); Erh-Ming Hsieh, Taichung (TW); Cheng-Hsien Wu, Kaohsiung (TW); Cheng-Hao Chiu, Kaohsiung (TW)

(73) Assignee: Jection Applied Materials Co. Ltd., Taichung (TW)

( * ) Notice: Subject to any disclaimer, the term of this patent is extended or adjusted under 35 U.S.C. 154(b) by 254 days.

This patent is subject to a terminal disclaimer.

(21) Appl. No.: 13/295,157

(22) Filed: Nov. 14, 2011

(65) Prior Publication Data

US 2012/0236600 A1  Sep. 20, 2012

(30) Foreign Application Priority Data

Mar. 18, 2011 (TW) .............................. 100109238 A

(51) Int. Cl.
| | |
|---|---|
| B29D 11/00 | (2006.01) |
| F21V 8/00 | (2006.01) |
| B29C 47/00 | (2006.01) |
| B29C 47/02 | (2006.01) |

(52) U.S. Cl.
CPC .......... *G02B 6/0043* (2013.01); *B29C 47/0021* (2013.01); *B29C 47/0057* (2013.01); *B29C 47/0061* (2013.01); *B29C 47/026* (2013.01)

(58) Field of Classification Search
USPC ........................... 264/1.1, 1.7, 1.29, 1.38, 1.6
IPC ........ B29C 47/0021,47/0057, 47/0061, 47/026; G02B 6/0043
See application file for complete search history.

(56) References Cited

U.S. PATENT DOCUMENTS

| | | | |
|---|---|---|---|
| 7,862,223 B2 | 1/2011 | Hsu | |
| 8,721,148 B2 * | 5/2014 | Lai et al. | 362/600 |
| 2008/0247191 A1 * | 10/2008 | Hsu | 362/612 |
| 2012/0051091 A1 * | 3/2012 | Landry et al. | 362/619 |

FOREIGN PATENT DOCUMENTS

KR  800512  *  2/2008

* cited by examiner

*Primary Examiner* — Mathieu Vargot
(74) *Attorney, Agent, or Firm* — Alan D. Kamrath; Kamrath IP Lawfirm, P.A.

(57) ABSTRACT

A LGF roll-to-roll manufacturing includes the steps of: preparing a first optical layer with a first surface and a second surface; mechanically extruding a first integrated microstructure on the first surface of the first optical layer; subsequently coating a second optical layer on the first or second surface of the first optical layer; and curing the second optical layer to directly form a second microstructure on the first or second surface of the first optical layer. The first integrated microstructure and the second microstructure are separately formed at a time to provide a light guide film structure. In an embodiment, an additional optical layer is provided on the first optical layer.

16 Claims, 5 Drawing Sheets

LGF ROLL-TO-ROLL MANUFACTURING METHOD AND STRUCTURE THEREOF

BACKGROUND OF THE INVENTION

1. Field of the Invention

The present invention relates to a LGF (light guide film) roll-to-roll (R2R) manufacturing method and a structure thereof which is applied to a LCD (liquid crystal display) backlight module. More particularly, the present invention relates to the LGF roll-to-roll manufacturing method utilizing mechanical extrusion and UV curing non-synchronously or synchronously and the structure manufactured thereby.

2. Description of the Related Art

U.S. Pat. No. 7,862,223, entitled "Thin and flexible light guide element," discloses a thin and flexible light guide element and a manufacturing method thereof. The thin and flexible light guide element comprises: a first optical layer composed of a flexible transparent material; a second optical layer formed on the lower side of the first optical layer and having a light-adjusting structure to change the light path; and a third optical layer formed on the upper side of the first optical layer and having a convex-concave structure to homogenize the light emitted from the first optical layer. The first and second optical layers have different refractive indices.

The second optical layer is formed by a first composition coated on the lower-side surface of the first optical layer. The first composition includes a mixture of a UV curing resin monomer and a photo initiator. Furthermore, the third optical layer is formed in the same way by a second composition coated on the upper-side surface of the first optical layer. The second composition includes an anti-static agent, a UV curing resin, organic particles and an additive. The additive is selected from a thermal setting resin, a thermal plastic resin and a mixture thereof.

Accordingly, the first and second optical layers have relatively different refractive indices. In manufacturing, the second and third optical layers are continuously produced by a series of roll-to-roll (R2R) procedures. Namely, each of the second and third optical layers is separately formed by a curing process on each of the lower-side and upper-side surfaces of the first optical layer.

In order to form the second and third optical layers on the different two sides of the first optical layer, several coating and curing processes are required in different sides. However, the double-side coating and curing processes applied to a single thin film are complex and difficult. Disadvantageously, this results in an increase of the manufacturing cost.

Consequently, there exists a need of providing a simplified method for producing such a thin and flexible light guide element. U.S. Pat. No. 7,862,223 is incorporated herein by reference for purposes including, but not limited to, indicating the background of the present invention and illustrating the state of the art.

As is described in greater detail below, the present invention provides a simplified LGF roll-to-roll manufacturing method and a structure thereof. A first integrated (extruded) microstructure is extruded to form a first surface of an optical layer, and a second microstructure is formed on the optical layer non-synchronously or synchronously in such a way to mitigate and overcome the above problem.

SUMMARY OF THE INVENTION

The primary objective of this invention is to provide a LGF roll-to-roll manufacturing method and a structure thereof. A first integrated (extruded) microstructure is extruded to form a first surface of an optical layer, and a second microstructure is formed on the optical layer non-synchronously or synchronously. Accordingly, the LGF roll-to-roll manufacturing method is successful in reducing the manufacturing steps and total processing time, in simplifying the entire structure and in reducing the manufacturing cost.

The LGF roll-to-roll manufacturing method in accordance with an aspect of the present invention includes the steps of:
preparing a first optical layer with a first surface and a second surface;
mechanically extruding a first integrated microstructure on the first surface of the first optical layer;
subsequently downward-coating a second optical layer on the second surface of the first optical layer; and
curing the second optical layer to directly form a second microstructure on the second surface of the first optical layer, with the first integrated microstructure and the second microstructure separately formed at a time.

In a separate aspect of the present invention, the first integrated microstructure is continuously extruded in a roll-to-roll process.

In a further separate aspect of the present invention, when the first integrated microstructure is extruded, a UV curing resin or a thermosetting resin is coated to form the second optical layer on the second surface of the first optical layer by a coating roller.

In yet a further separate aspect of the present invention, the second optical layer is cured to form the second microstructure by a UV light device.

A light guide film structure in accordance with an aspect of the present invention includes:
a first optical layer provided with a first surface and a second surface;
a first integrated microstructure mechanically extruded on the first surface of the first optical layer with the first integrated microstructure and the first optical layer combined in a single layer; and
a second optical layer downward-coated on the second surface of the first optical layer;
a second microstructure formed by curing the second optical layer, with the first integrated microstructure and the second microstructure separately formed at a time.

In a separate aspect of the present invention, the first integrated microstructure has a convex-concave structure, a V-shaped groove structure, a prism ridge structure or a flycut structure.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that a LGF roll-to-roll manufacturing method in accordance with the preferred embodiment of the present invention is suitable for various LGF optical elements. A light guide film structure in accordance with the preferred embodiments of the present invention is suitable for assembling in any backlight module, which is not limitative of the present invention.

Figure 1:
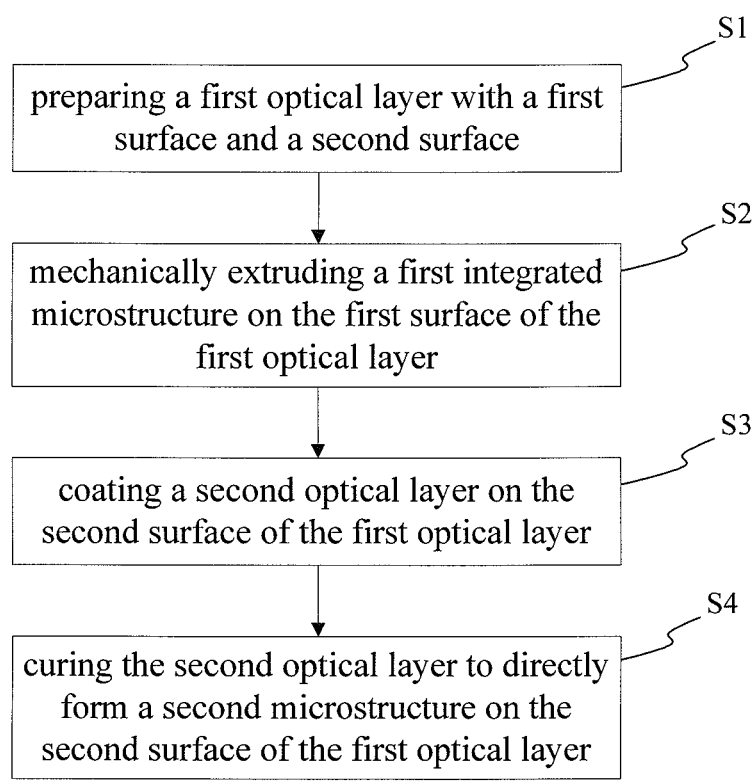
FIG. 1 is a schematic block diagram of a LGF roll-to-roll manufacturing method in accordance with a preferred embodiment of the present invention.

FIG. 1 shows a schematic block diagram of a LGF roll-to-roll manufacturing method in accordance with preferred embodiments of the present invention, with four main steps provided. Referring to FIG. 1, the LGF roll-to-roll manufacturing method includes first to fourth steps S1, S2, S3 and S4, whose orders can be changed according to needs.

Figure 2A:
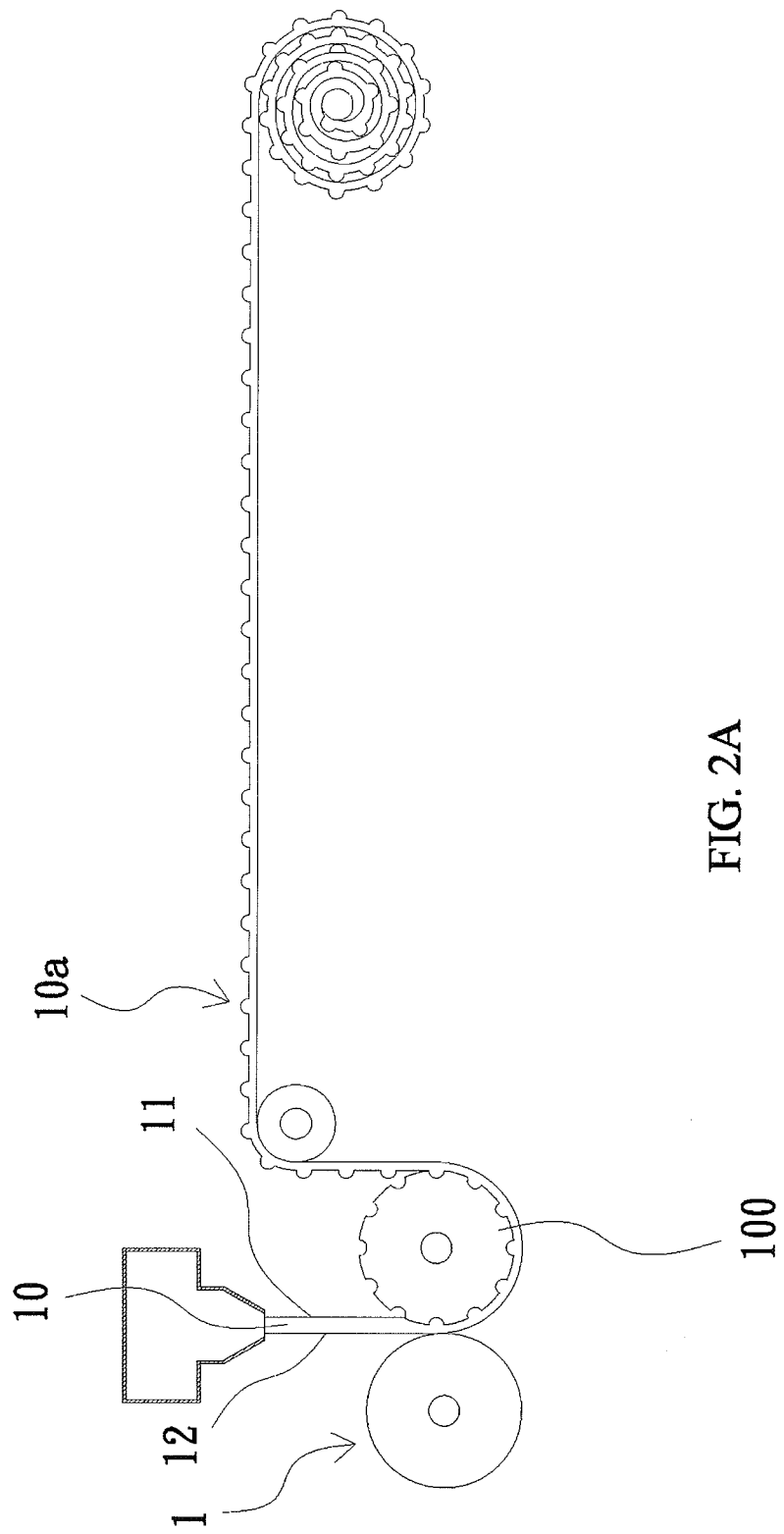
FIGS. 2A, 2B and 2C are three schematic side views of the LGF roll-to-roll manufacturing system in accordance with a preferred embodiment of the present invention.
Figure 2B:
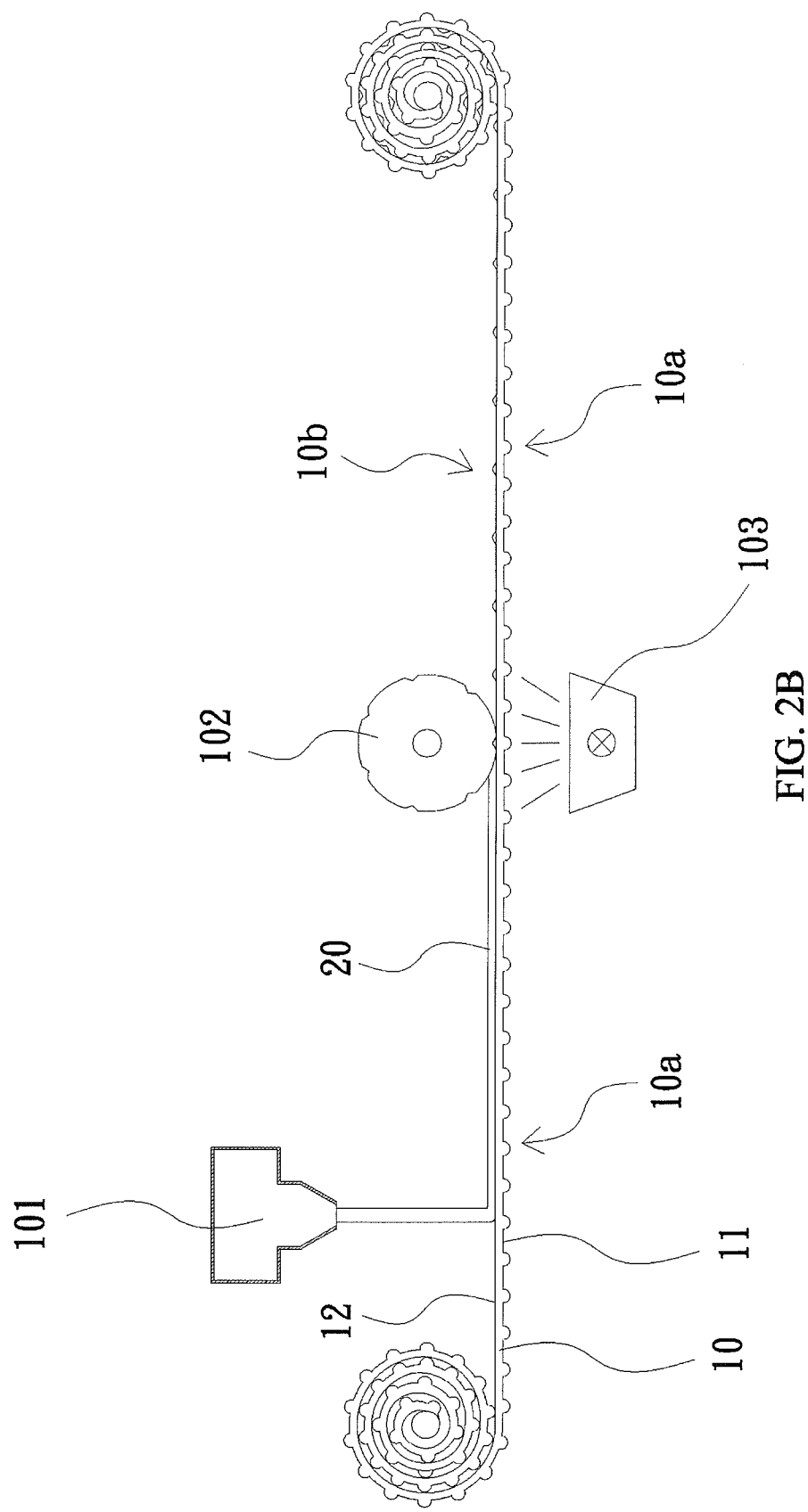

FIGS. 2A and 2B show two schematic side views of the LGF roll-to-roll manufacturing system applied in the manufacturing method in accordance with preferred embodiments of the present invention. In FIGS. 2A and 2B, by way of example, the LGF roll-to-roll manufacturing method shown in FIG. 1 is suitably executed in the LGF roll-to-roll manufacturing system to produce a light guide film structure.

Referring to FIGS. 1, 2A and 2B, the LGF roll-to-roll manufacturing method in accordance with of the present invention includes a first step S1: preparing and supplying a first optical layer 10 with a first surface 11 and a second surface 12. The first surface 11 and the second surface 12 are provided on opposite sides of the first optical layer 10 and designated as an upper surface and a lower surface. The first optical layer 10 is formed from a flexible transparent material such as a plastic material with a first refractive index, for example.

By way of example, the flexible transparent material is selected from: polyester resin (e.g. polyethylene terephthalate (PET) or polyethylene naphthalate (PEN)); polyacrylate resin (e.g. polymethyl methacrylate (PMMA)); polyimide resin; polyolefin resin (e.g. polyethylene (PE) or polypropylene (PP)); polycycloolefin resin; polycarbonate resin; polyurethane resin; triacetate cellulose (TAC); and a mixture thereof.

With continued reference to FIGS. 1, 2A and 2B, the first optical layer 10 is initially extracted from a nozzle (not labeled) continuously and is further conveyed by a roller assembly 1, as best shown in left side of FIG. 2A. In a preferred embodiment, the roller assembly 1 mechanically connects with an optical film manufacturing machine (not shown) or other similar device.

Still referring to FIGS. 1, 2A and 2B, the LGF roll-to-roll manufacturing method in accordance with the present invention includes a second step S2: mechanically extruding a first integrated (extruded) microstructure 10a on the first surface 11 of the first optical layer 10 with the first integrated microstructure 10a and the first optical layer 10 combined in a single layer. By way of example, the roller assembly 1 includes a pattern-printing roller 100 (as best shown in the left side of FIG. 2A) which is continuously operated to extrude the first integrated microstructure 10a on the first surface 11 of the first optical layer 10. Accordingly, the first integrated microstructure 10a is continuously produced on the first surface 11 of the first optical layer 10 in a roll-to-roll process.

Turning now to FIGS. 1 and 2B, the LGF roll-to-roll manufacturing method in accordance with the present invention includes a third step S3: synchronously or non-synchronously downward-coating a second optical layer 20 on the second surface 12 of the first optical layer 10 when extruding the first integrated microstructure 10a and conveying the first optical layer 10 through the roller assembly 1, as best shown in the left side of FIG. 2A. The roller assembly 1 includes a resin-supplying nozzle 101 and a pattern-printing roller 102 provided above the first optical layer 10, as shown in FIG. 2B. The resin-supplying nozzle 101 supplies resin downward on the second surface 12 for forming the second optical layer 20.

With continued reference to FIGS. 1 and 2B, the resin-supplying nozzle 101 continuously supplies a UV curing resin or a thermosetting resin on the second surface 12 of the first optical layer 10 so that the second optical layer 20 is formed. Subsequently, the pattern-printing roller 102 continuously rotates to print predetermined patterns of the UV curing resin or the thermosetting resin with a second refractive index on the second surface 12 of the first optical layer 10. The second refractive index is similar to or different from the first refractive index. Preferably, the UV curing resin is selected from styrene, naphthylethylene, phenyl acrylate, naphthyl acrylate and a mixture thereof.

In another embodiment, the second optical layer 20 is further selectively formed by, for example, physical vapor decomposition (PVD), chemical vapor decomposition (CVD), mechanical attachment or laser engraving technology on the second surface 12 of the first optical layer 10.

Figure 2C:
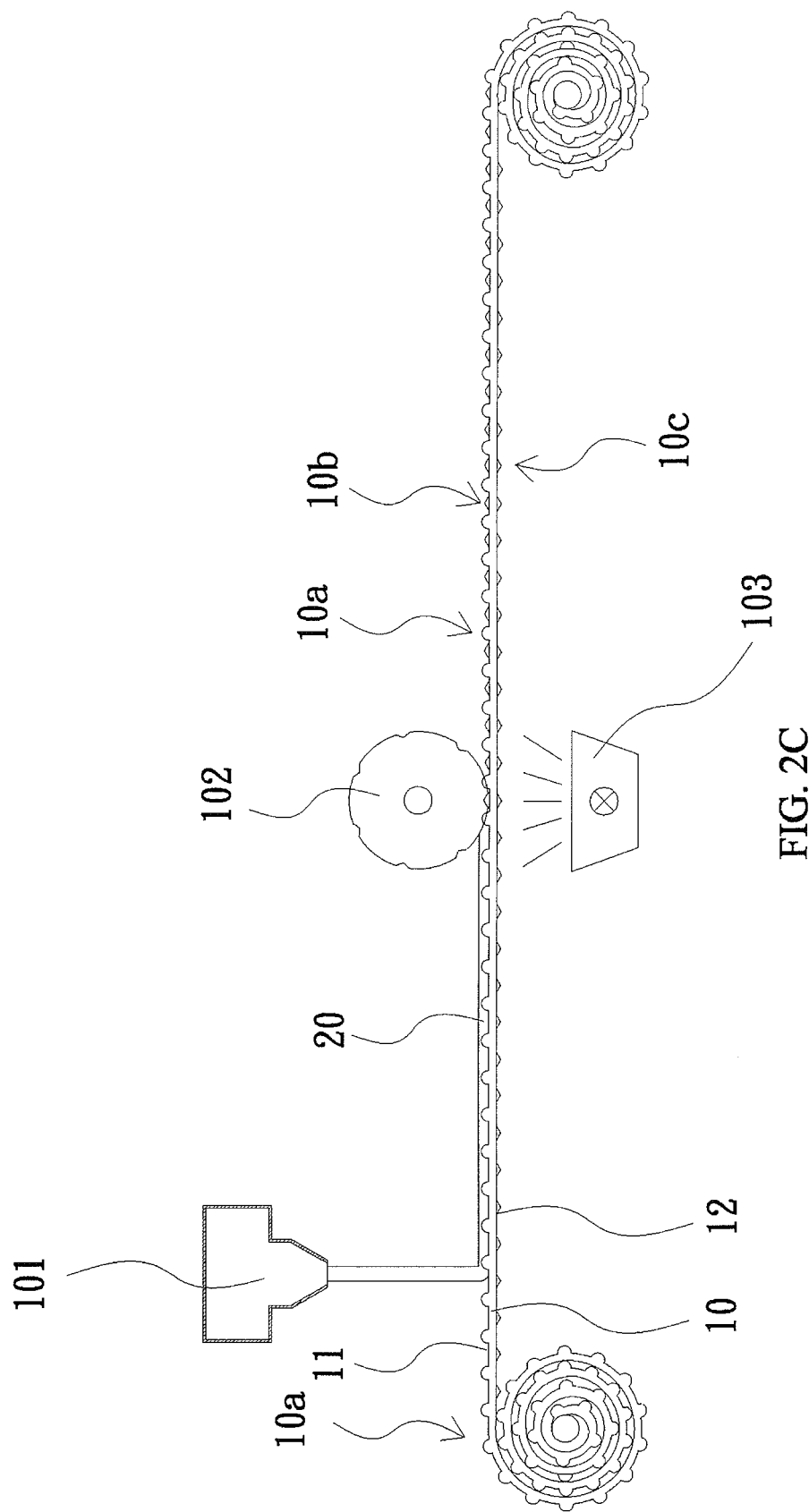

Turning now to FIG. 2C, in an alternative, an additional optical layer or the second optical layer 20 is selectively coated on the first surface 11 of the first optical layer 10, when conveying the first optical layer 10 through the roller assembly 1. Consequently, the first integrated microstructure 10a of the first optical layer 10 is coated by the second optical layer 20. In an alternative, an additional microstructure 10c is provided.

Still referring to FIGS. 1, 2B and 2C, the LGF roll-to-roll manufacturing method in accordance with the present invention includes a fourth step S4: curing the additional optical layer or the second optical layer 20 to directly form a second microstructure 10b on the second surface 12 of the first optical layer 10 or the first surface 11 of the first optical layer 10. Accordingly, the first integrated microstructure 10a and the second microstructure 10b are separately formed at a time. For example, a UV light device 103 illuminates the second optical layer 20, so that predetermined patterns of the second microstructure 10b are formed on the second surface 12, the first integrated microstructure 10a or both. In an embodiment, the UV light device 103 is mounted above or below the first optical layer 10.

Figure 3:
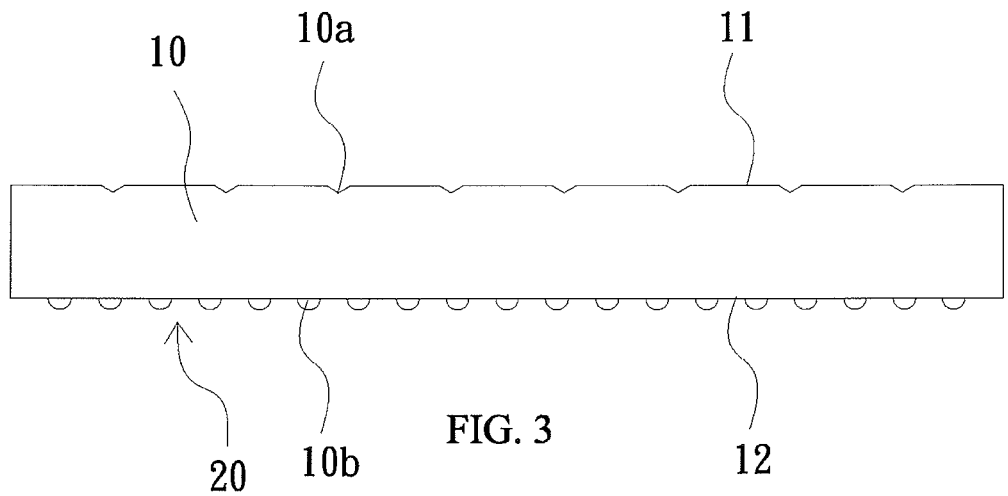
FIGS. 3 through 5 are three side schematic views of LGF structures produced by the manufacturing method in accordance with the preferred embodiment of the present invention.

FIG. 3 shows a side schematic view of a LGF structure in accordance with the first preferred embodiment of the present invention produced by the manufacturing method shown in FIGS. 1 and 2A-2C. Referring to FIG. 3, the LGF structure in accordance with the first preferred embodiment of the present invention includes two microstructures, and each of the two optical layers is arranged to provide the corresponding microstructure.

Referring to FIGS. 2A, 2B and 3, the two optical layers of the LGF structure correspond to the first optical layer 10 and the second optical layer 20. The first surface 11 of the first optical layer 10 is designated as a light-entering surface, while the second surface 12 located at the second optical layer 20 is designated as a light-emitting surface. Furthermore, the two microstructures the LGF structure correspond to the first integrated microstructure 10a and the second microstructure 10b. The first integrated microstructure 10a has a function of condensing light, and the second microstructure 10b has a function of homogenizing light.

Still referring to FIGS. 2A, 2B and 3, the first integrated microstructure 10a has a V-shaped groove structure or a flycut structure directly extruded on the first surface 11 of the first optical layer 10, such that the first integrated microstructure 10a and the first optical layer 10 are combined as a single optical layer. In addition, the second microstructure 10b is further formed on the second surface 12 located at the second optical layer 20.

Figure 4:
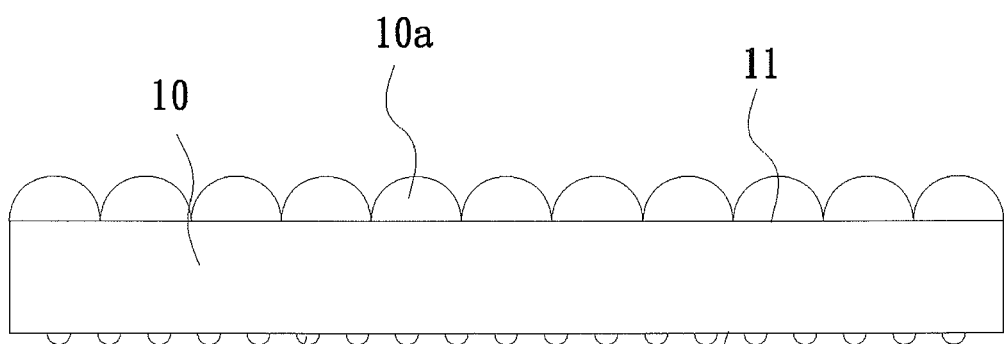

FIG. 4 shows a side schematic view, similar to that shown in FIG. 3, of a LGF structure in accordance with the second preferred embodiment produced by the manufacturing method shown in FIGS. 1 and 2A-2C. Referring to FIG. 4, the LGF structure of the second preferred embodiment includes a convex-concave structure of the first integrated microstructure 10a. Each ridge of the convex-concave structure extends and winds its path on the first surface 11 of the first optical layer 10.

Figure 5:
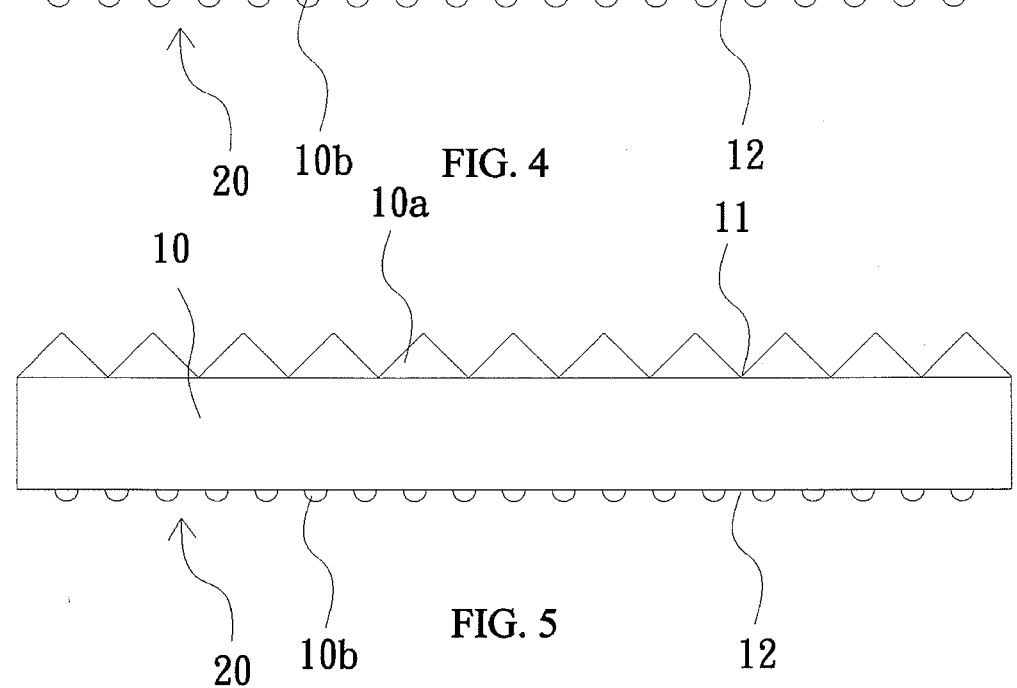

FIG. 5 shows a side schematic view, similar to that shown in FIG. 3, of a LGF structure in accordance with the third preferred embodiment produced by the manufacturing method shown in FIGS. 1 and 2A-2C. Referring to FIG. 5, the LGF structure of the third preferred embodiment includes a prism ridge structure of the first integrated microstructure 10a.

Although the invention has been described in detail with reference to its presently preferred embodiment(s), it will be understood by one of ordinary skill in the art that various modifications can be made without departing from the spirit and the scope of the invention, as set forth in the appended claims.

What is claimed is:

1. A LGF roll-to-roll manufacturing method comprising:
preparing a first optical layer with a first surface and a second surface opposite to the first surface;
operating a first pattern printing roller to mechanically extrude a first integrated microstructure on the first surface of the first optical layer located above the second surface to form a first thickness;
after mechanically extruding, downward-supplying a first UV curing material or thermosetting material from a first device above the first optical layer for downward-coating a second optical layer on the second surface of the first optical layer located above the first surface; and
after downward-supplying and downward-coating, continuously rotating a second pattern printing roller engaging the second surface located above the first surface to print patterns of the first UV curing material or thermosetting material and curing the first UV curing material or thermosetting material of the second optical layer to directly form a second microstructure with a second thickness on the second surface of the first optical layer; wherein the second thickness is thinner than the first thickness to thereby reduce a total thickness; wherein the first integrated microstructure and the second microstructure are produced by a serial procedure consisting of mechanically extruding the first optical layer through the first pattern printing roller on the first surface above the second surface, downward-supplying the first UV curing material or thermosetting material on the second surface above the first surface, and pattern printing and curing the first UV curing material or thermosetting material through the second pattern printing roller engaging the second surface above the first surface.

2. The manufacturing method as defined in claim 1, wherein the first integrated microstructure is continuously extruded in a roll-to-roll process.

3. The manufacturing method as defined in claim 1, wherein downward-supplying comprises coating the first UV curing resin or thermosetting resin to form the second optical layer on the second surface of the first optical layer, when the first integrated microstructure is extruded.

4. The manufacturing method as defined in claim 1, wherein the second optical layer is further treated by physical vapor decomposition, chemical vapor decomposition, mechanical attachment or laser engraving.

5. The manufacturing method as defined in claim 1, wherein a second UV curing resin or thermosetting resin is coated to form an additional optical layer on the first surface of the first optical layer by downward-supplying the second UV curing material or thermosetting material from a second device above the first optical layer for downward-coating the additional optical layer on the first integrated microstructure and the first surface of the first optical layer, when the first integrated microstructure is extruded.

6. The manufacturing method as defined in claim 5, wherein the second UV curing material or thermosetting material of the additional optical layer is cured to form a third microstructure with a third thickness on the first surface of the first optical layer; wherein the third thickness is thinner than the first thickness to thereby reduce the total thickness.

7. The manufacturing method as defined in claim 1, wherein the first integrated microstructure and the second microstructure are separately formed at a time.

8. A LGF roll-to-roll manufacturing method comprising:
preparing a first optical layer with a first surface and a second surface opposite to the first surface;
operating a first pattern printing roller to mechanically extrude a first integrated microstructure on the first surface of the first optical layer above the second surface to form a first thickness;
after mechanically extruding, downward-supplying a first UV curing material or thermosetting material from a first device above the first optical layer for downward-coating a second optical layer on the first integrated microstructure and the first surface of the first optical layer above the second surface; and
after downward-supplying and downward-coating, continuously rotating a second pattern printing roller to print patterns of the first UV curing material or thermosetting material and curing the first UV curing material or thermosetting material of the second optical layer to directly form a second microstructure with a second thickness on the first surface of the first optical layer; wherein the second thickness is thinner than the first thickness to thereby reduce a total thickness; wherein the first integrated microstructure and the second microstructure are produced by a serial procedure consisting of mechanically extruding the first optical layer through the first pattern printing roller on the first surface above the second surface, downward-supplying the first UV curing material or thermosetting material on the first surface above the second surface, and pattern printing and curing the first UV curing material or thermosetting material through the second pattern printing roller engaging the first surface located above the second surface.

9. The manufacturing method as defined in claim 8, wherein the first integrated microstructure is continuously extruded in a roll-to-roll process.

10. The manufacturing method as defined in claim 8, downward-supplying comprises coating the first UV curing resin or thermosetting resin to form the second optical layer on the first surface of the first optical layer, when the first integrated microstructure is extruded.

11. The manufacturing method as defined in claim 8, wherein the second optical layer is further treated by physical vapor decomposition, chemical vapor decomposition, mechanical attachment or laser engraving.

12. The manufacturing method as defined in claim 8, wherein a second UV curing resin or thermosetting resin is coated to form an additional optical layer on the second surface of the first optical layer by downward-supplying the second UV curing material or thermosetting material from a second device above the first optical layer for downward-coating the additional optical layer on the second surface of the first optical layer, when the first integrated microstructure is extruded.

13. The manufacturing method as defined in claim 12, wherein the second UV curing material or thermosetting material of the additional optical layer is cured to form a third microstructure with a third thickness on the second surface of the first optical layer; wherein the third thickness is thinner than the first thickness to thereby reduce the total thickness.

14. The manufacturing method as defined in claim 8, wherein the first integrated microstructure and the second microstructure are separately formed at a time.

15. The manufacturing method as defined in claim 5, wherein the first integrated microstructure on the first surface of the first optical layer is embedded by the additional optical layer.

16. The manufacturing method as defined in claim 8, wherein the first integrated microstructure on the first surface of the first optical layer is embedded by the second optical layer.

* * * * *